Figure 1:
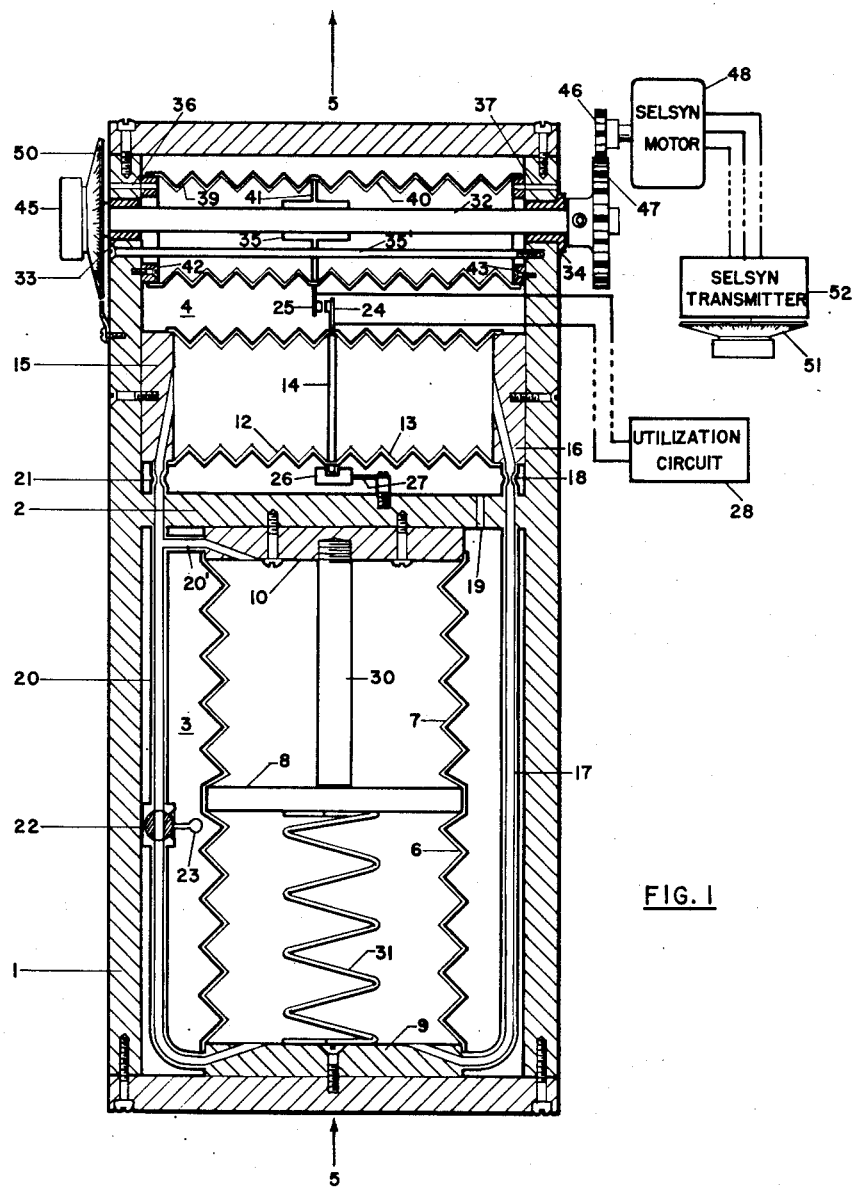

Nov. 17, 1953  C. N. HICKMAN  2,659,589
INTEGRATING ACCELEROMETER
Filed Sept. 23, 1952  2 Sheets-Sheet 1

FIG. I

INVENTOR
C. N. HICKMAN
BY Roland A. Anderson
ATTORNEY

Nov. 17, 1953

C. N. HICKMAN 2,659,589

INTEGRATING ACCELEROMETER

Filed Sept. 23, 1952

2 Sheets-Sheet 2

INVENTOR.
C. N. HICKMAN
BY Roland G. Anderson
ATTORNEY

Patented Nov. 17, 1953

2,659,589

UNITED STATES PATENT OFFICE 2,659,589

INTEGRATING ACCELEROMETER

Clarence N. Hickman, Albuquerque, N. Mex., assignor, by mesne assignments, to the United States of America as represented by the United States Atomic Energy Commission Application September 23, 1952, Serial No. 311,105

9 Claims. (Cl. 264—1)

1

This invention relates to an improved integrating accelerometer, especially useful in recording the variations in velocity of any moving body, for example, an object rising from the earth's surface and returning thereto.

It is therefore a general object of the invention to provide means for measuring the velocity of a moving body subjected to acceleration in the course of its motion.

The device to be described may be arranged to furnish either a continuous record of velocity or an indication of the attainment of a specified velocity, and the provision of such a device is another object of the invention.

The invention makes use of a gas of which the rate of flow under a differential pressure is responsive to acceleration. Since the viscosity of a gas of constant density is substantially independent of temperature, a change in temperature results in a change in flow rate negligible as compared with a like change when a liquid is used for a similar purpose.

Another object of the invention is therefore to provide a pneumatic integrating accelerometer of which the indications are substantially unaffected by a change in temperature.

A feature of the invention is the complete isolation of the working gas from the outside atmosphere. This permits operation of the accelerometer unaffected by outside influences, short of its actual destruction.

Inasmuch as the invention includes means for integrating with time the acceleration experienced by the instrument and for deriving a voltage proportional to that integral, known electrical integrating means are applicable to integrate with time the derived voltage. That is, provided the initial velocity of the body carrying the accelerometer is known, the derived voltage is at any instant an indication of the velocity of the body, and the body's position at that instant is indicated by the magnitude of the integrated voltage. It may obviously be arranged that when either the derived or the integrated voltage reaches a predetermined magnitude a circuit shall be completed for the performance of any desired operation. For example, it may be required to effect a change in the behavior of the carrying body when it has traveled to a predetermined velocity or a predetermined distance from the starting point. This requirement may be met without regard to outside interference, again short of actual destruction of the carrying body.

Therefore, another object of the invention is

2 to provide an integrating accelerometer conjoined with means for indicating at any instant the velocity and the position of the vehicle carrying the accelerometer.

Figure 2:
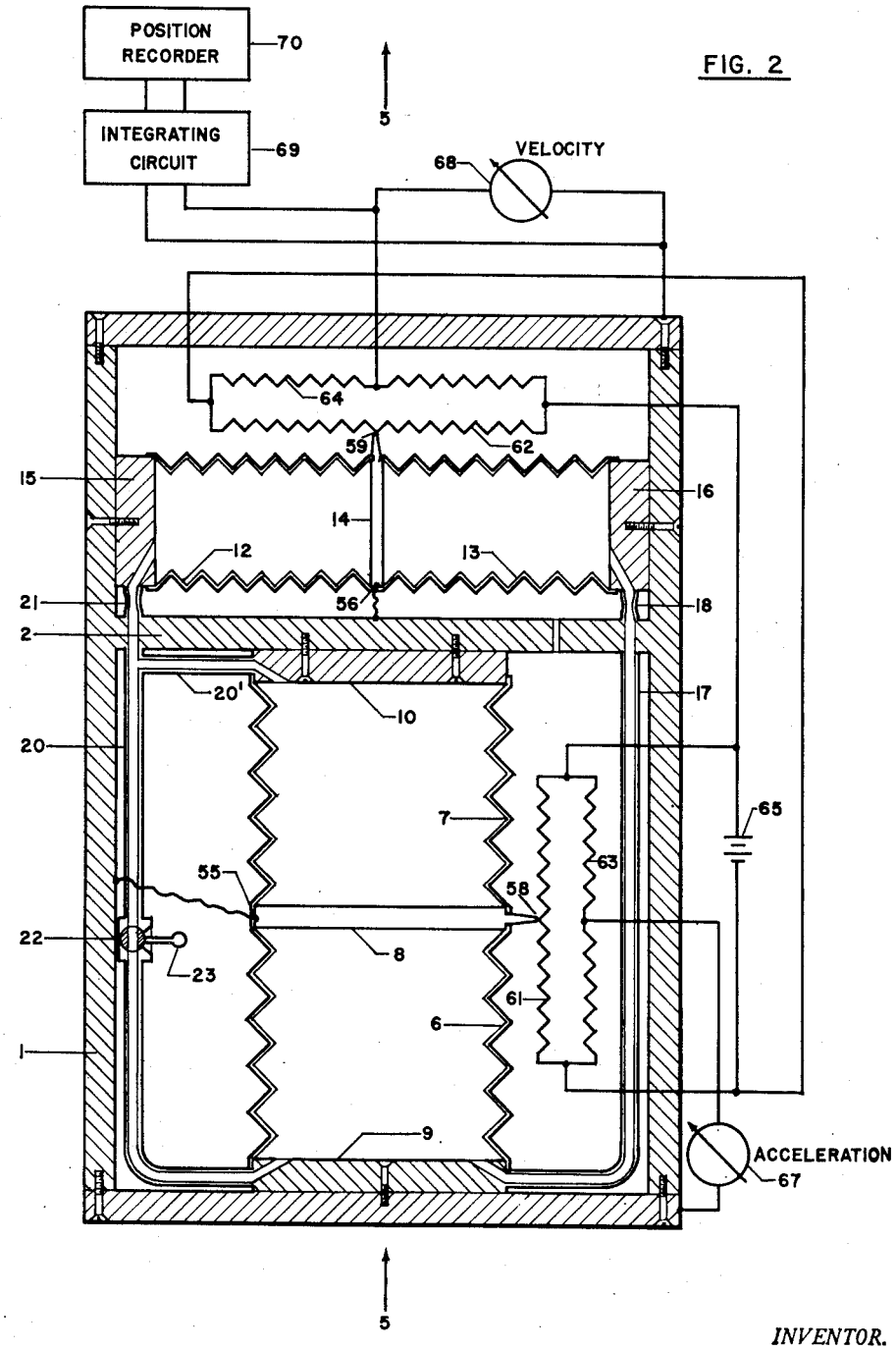

The invention itself will be understood from the following description of illustrative embodiments thereof, read with reference to the accompanying drawings, in which:

Fig. 1 shows a longitudinal section of the accelerometer and its housing, arranged to respond to an axial acceleration in one sense only, namely, in the direction of the arrows; and Fig. 2 shows in like section an accelerometer capable of continuously indicating axial accelerations in either sense.

Referring to Fig. 1, numeral 1 designates a casing which may conveniently be rectangular in cross section and constructed of any suitable material impervious to gases. The interior of casing 1 is divided by transverse rigid member 2 into two compartments 3 and 4, the latter of which will be discussed later herein.

Within compartment 3 are mounted two equal "sylphons" 6 and 7, joined by a weighted baffle 8. The ends of "sylphons" 6 and 7 remote from baffle 8 are sealed respectively to blocks 9 and 10 affixed to the base of housing 1 and to member 2 respectively. In compartment 4 are mounted, axially at right angles to "sylphons" 6 and 7, two like "sylphons" 12 and 13, joined by a light baffle 14. "Sylphons" 12 and 13 are sealed at their ends remote from baffle 14 to blocks 15 and 16, respectively, affixed to opposite sides of casing 1. It is to be understood that all blocks are fastened gas-tight to the respective "sylphons" and portions of casing 1, including closure 2.

The interior of "sylphon" 6 is permanently in communication with that of "sylphon" 13 through a tube 17, in which a constriction 18 is provided at any convenient point along its length. Likewise, "sylphon" 6 normally communicates with "sylphons" 7 and 12 through tube 20 and branch tube 20'. Valve 22 in tube 20 is normally open, but is inertially operated by weight 23 to close when the accelerometer undergoes an acceleration. In the figure, valve 22 is shown open, the instrument being considered not yet responding to an acceleration in the direction of the arrows 5. Closure of valve 22 shuts off "sylphon" 6 from "sylphon" 7, but leaves the latter in communication with "sylphon" 12. Constriction 21 is provided at a point in tube 20 intermediate its opening into "sylphon" 12 and its junction with branch tube 20'. The office of constrictions 18 and 21 is obviously to regulate the time rate of flow of gas. This flow will, of course, depend on the rarefaction or compression of the gas in the force measuring "sylphons" 6 and 7, which force is a measure of the acceleration.

In the case of an acceleration in the direction of arrows 5, baffle 8 moves (relatively to casing 1) to increase the pressure in "sylphon" 6 and decrease that in "sylphon" 7, while valve 22 closes. Until this motion of baffle 8 and valve 22, the pressure was the same in all four "sylphons." Now, however, gas from "sylphon" 6 flows into "sylphon" 13 and gas from "sylphon" 12 flows into "sylphon" 7. As a result, baffle 14 moves (to the left in the figure) at a rate proportional to the acceleration of casing 1 and through a distance proportional to the time integral of that acceleration. Insulated from but carried by baffle 14, electrical contact 24 is moved to a position distant from its initial location by an amount proportional to the velocity of casing 1 and so of the carrying body (not shown) in which casing 1 is mounted. Latch 26, initially held by a light spring 27 in engagement with baffle 14 in a central position thereof, moves downward under acceleration in the direction of the arrows and thereby frees baffle 14 to move as required.

In member 2 a vent 19 is provided, enabling equalization of pressures in compartments 3 and 4.

Mating with contact 24 at any desired position of baffle 14, is an adjustable contact 25. Connections to these contacts lead externally of casing 1 to a utilization circuit 28 of any desired character. Closing of contacts 24 and 25 is thereby effective to bring about operation of circuit 28 when a predetermined velocity has been acquired by the body carrying the accelerometer.

"Sylphons" 6, 7, 12 and 13 are of extremely low stiffness, so that the movements of baffles 8 and 14 are not restricted, except as baffle 8 is restricted to downward displacement by post 30 in "sylphon" 7. Motion of baffle 14 is thus responsive only to velocities acquired in the direction of the arrows.

If this direction is vertically upward in space, as is the case of a rocket launched straight up, the effect of gravity can be discounted by including in "sylphon" 6 a light spring 31 adjusted in stiffness to offset the force of gravity acting on baffle 8. The provision of this spring is desirable in such a measurement for the reason that gravity is acting on casing 1 at the same time as on baffle 8. Where the acceleration to be measured is horizontal, spring 31 is omitted. Where the line of acceleration is inclined to the vertical, spring 31 is correspondingly reduced in stiffness.

It will be noted that the flow of gas into one and out of the other of "sylphons" 12 and 13 drives baffle 14 to equalize the pressures on its two faces. Therefore, when the acceleration is over, there is no force acting on baffle 14 and its position remains that to which it was driven during acceleration. The excursion of baffle 14 from its initial rest position is determined by the pressure differential established in "sylphons" 6 and 7 and by the rate of flow of gas through constrictions 18 and 21; this rate determines the time required for baffle 14 to reach its final position.

Calibration of the accelerometer is made by affixing to baffle 8 a known weight and measuring the time required for baffle 14 to complete its excursion. Since the rate of flow is substantially proportional to the force on baffle 8, a single such experiment is ordinarily sufficient. In this way it may be determined the velocity corresponding to any final position attained by baffle 8. Since the working gas is isolated from the outside atmosphere, it may be other than air.

The form of the invention illustrated in Fig. 1 is particularly useful when it is desired to bring about the operation of a utilization circuit, of chosen character, on the attainment of a preselected velocity of the carrying body.

In Fig. 1, the upper extension of compartment 4 includes a shaft 32 journaled in casing 1 at 33 and 34. Adjacent these positions, holes 36 and 37 are provided in casing 1. To preserve the structures previously described from communication with the outside atmosphere, a third pair of "sylphons" 39 and 40 are introduced, meeting in a junction member 41 (of any suitable rigid material) which is threaded on shaft 32 as shown. "Sylphons" 39 and 40 are sealed at their outer ends to casing 1 by rings 42, 43 which encompass at each end shaft 32 and the adjacent holes 36 and 37. These "sylphons" may be of any convenient stiffness, enough to prevent rotation of member 41 except as demanded either by manual control knob 45 or by gears 46, 47 controlled by "selsyn" motor 48. Because of holes 36, 37 at each side of casing 1, the interiors of "sylphons" 39 and 40 are both at atmospheric pressure; the position of member 41 thus depends only on the rotation given shaft 32. Member 41 may also be provided with a flange 35 through which passes bolt 35'.

Member 41 carries, outside the attached "sylphons," a contact 25. In addition to knob 45, remote control is provided by "selsyn" transmitter 52, enabling shaft 32 to be driven from a distant point.

Scales 50, 51 are provided on knob 45 and for "selsyn" 52, respectively, to indicate the setting of contact 25 relative to contact 24, and these scales are graduated in velocity. Contact 25 may thus be set to be met by contact 24 when any preselected velocity is attained by the carrying body. When this meeting takes place, utilization circuit 28 is energized and functions to bring about the desired result.

Fig. 2 shows an embodiment of the invention adapted to the continuous measurement of acceleration, velocity and position of the vehicle carrying the accelerometer. Elements common to Figs. 1 and 2 are designated by like numerals.

Arrows 5 again indicate acceleration in a particular sense along the axis of the instrument. This sense is chosen for illustration only to facilitate the description of the operation. Under an acceleration in the sense indicated, baffle 8 moves downward relatively to casing 1 while valve 22 is closed by weight 23, also moving downward. The flow of gas from "sylphon" 6 to "sylphon" 13, and from "sylphon" 12 to "sylphon" 7, takes place as described in connection with Fig. 1. Baffle 14 moves to the left, as before. Inertially operated latches, not shown, may be supplied to fix the initial positions of baffles 8 and 14, for the same purpose as latch 26 in Fig. 1.

Baffles 8 and 14 are each grounded, to casing 1 at 55 and to member 2 at 56, respectively. Each baffle either is made of conducting material or provides a conducting path from the grounded point to its opposite extremity, where brushes 58 on baffle 8, 59 on baffle 14, sweep over potentiometers 61 and 62. Potentiometers 61 and 62 are linear and are respectively in parallel with resistors 63 and 64. The Wheatstone bridges composed of elements 61—63 and 62—64 are supplied from battery 65. Between ground and the midpoint of resistor 63 is connected voltmeter 67. Similarly, between ground and the midpoint of resistors 64, is connected voltmeter 68.

The departure of brush 58 from the midpoint of potentiometer 61 is a measure of the acceleration, read on voltmeter 67, while the excursion of baffle 14 in either direction from its undisturbed position is a measure of the velocity attained at any moment, and the accompanying excursion of brush 59 from the midpoint of potentiometer 62 measures that velocity, which is read on voltmeter 68. In addition, the voltage applied across voltmeter 68 may be supplied to an integrating circuit 69, of which the output voltage represents the travel of the body carrying the accelerometer from an initial position. This output voltage may be recorded by any known recording mechanism 70.

Brushes 58 and 59 may be adjusted on their respective potentiometers so that in the initial position neither of voltmeters 67 or 68 reads other than zero. Voltmeter 67, with zero at the center of its scale, may thus read a positive or negative acceleration according to the direction in which baffle 8 moves from its position of rest. At the same time the reading of voltmeter 68 is representative of the velocity attained as a summation of the positive and negative accelerations which may have been experienced by the vehicle carrying the accelerometer.

I claim:

1. A pneumatic integrating accelerometer comprising: a rigid casing divided into two compartments by an apertured rigid member normal to the axis of the casing, said casing being provided with rigid base and top closures on opposite sides of and parallel to the apertured member; a first pair of gas-filled bellows parallel to the axis of the casing, united at their adjacent ends by a heavy baffle and hermetically sealed at their remote ends to the base and to the apertured member respectively; a second pair of gas-filled bellows normal to the axis of the casing, united at their adjacent ends by a light baffle and hermetically sealed at their remote ends to opposite sides of the casing; a first port including an inertially operated shutoff valve connecting the bellows of the first pair; a second and a third port respectively connecting one bellows of the first pair with one bellows of the second pair and connecting the other bellows of the first pair with the other bellows of the second pair; and means for indicating movement of the light baffle responsively to movement of the heavy baffle.

2. A pneumatic integrating accelerometer as in claim 1, including a first electrical contact carried by the light baffle, a second electrical contact adjustable to be met by the first contact at a desired position of the light baffle and a utilization circuit adapted to be completed by the meeting of said contacts.

3. A pneumatic integrating accelerometer as in claim 2, including means for preventing motion of the heavy baffle in a chosen sense.

4. A pneumatic integrating accelerometer as in claim 3, including a spring of prescribed stiffness opposing motion of the heavy baffle oppositely to the chosen sense.

5. A pneumatic integrating accelerometer comprising a rigid casing divided into a first and a second compartment by an apertured rigid member normal to the axis of the casing, a first pair of gas-filled bellows mounted gas-tight in the first compartment in series with a heavy baffle, a second pair of gas-filled bellows mounted gas-tight in the second compartment in series with a light baffle, the axes of said first and second pairs being respectively parallel and normal to the axis of the casing, a first port including an inertially operated shutoff valve connecting the bellows of the first pair, a second and a third port respectively connecting one bellows of the first with one bellows of the second pair and connecting the other bellows of the first with the other bellows of the second pair, a third pair of bellows mounted in the second compartment parallel to the second pair of bellows, a movable member joining adjacent ends of the bellows of the third pair, annular sealing means securing to the casing at each side thereof the ends of the bellows of the third pair remote from the movable member, said remote ends being open to the atmosphere through apertures in the casing within the sealing means, a rotatable shaft journaled in the casing within the sealing means at each side and threadedly engaging the movable member whereby said member is adjustably positioned lengthwise of the shaft, means for indicating the rotation of the shaft, a first electrical contact carried bp the light baffle, a second electrical contact carried by the movable member and adjustable to meet the first contact at a desired position thereof and a utilization circuit adapted to be completed by the meeting of said contacts.

6. Means for continuously indicating the motion of a vehicle subjected to acceleration comprising a pneumatic integrating accelerometer including a rigid casing divided into a first and a second compartment by an apertured rigid member normal to the axis of the casing, a first pair of gas-filled bellows mounted gas-tight in the first compartment in series with a heavy baffle, a second pair of gas-filled bellows mounted gas-tight in the second compartment in series with a light baffle, the axes of said first and second pairs being respectively parallel and normal to the axis of the casing, a first port including an inertially operated shutoff valve connecting the bellows of the first pair, a second and a third port respectively connecting one bellows of the first with one bellows of the second pair and the other bellows of the first with the other bellows of the second pair, a Wheatstone bridge adapted to be unbalanced by the departure of the heavy baffle from a rest position, power supply for said bridge and electrical indicating means responsive to the unbalance of said bridge.

7. Means as in claim 6 for continuously indicating the motion of a vehicle subjected to acceleration including a second Wheatstone bridge adapted to be unbalanced by departure from rest position of the light baffle, power supply for the second bridge and a second electrical indicating means responsive to the unbalance of the second bridge.

8. Means as in claim 7 for continuously indicating the motion of a vehicle subjected to acceleration including means for deriving a first voltage representing the unbalance of the first bridge and indicating the magnitude and polarity thereof, means for deriving a second voltage representing the unbalance of the second bridge and indicating the magnitude and polarity thereof, an electrical integrating circuit for deriving a third voltage representing the time integral of the second voltage and means for continuously recording the magnitude of the third voltage.

9. An integrating accelerometer comprising a casing, a first pair of bellows in said casing, an imperforate wall member common to each of said bellows and dividing one from the other, means closing end portions of the bellows spaced from said wall member, a second pair of bellows angularly disposed to said first pair of bellows, an imperforate wall member common to each of said second pair of bellows and dividing one from the other, means closing end portions of the second bellows spaced from the imperforate wall member thereof, a conduit interconnecting the bellows of said first pair and including an inertially operated shutoff valve, additional conduits connecting one bellows of the first pair with one bellows of the second pair and connecting the other bellows of the first pair with the other bellows of the second pair, and means operatively connected with at least one of said wall members for indicating movement thereof.

CLARENCE N. HICKMAN.

References Cited in the file of this patent

UNITED STATES PATENTS

| Number | Name | Date |
|---|---|---|
| 2,317,028 | Chappell | Apr. 20, 1943 |
| 2,440,605 | Hathaway | Apr. 27, 1948 |
| 2,504,644 | Burmist | Apr. 18, 1950 |
| 2,557,173 | Burmist | June 19, 1951 |